(12) United States Patent
Chadha et al.

(10) Patent No.: US 7,415,059 B2
(45) Date of Patent: Aug. 19, 2008

(54) METHOD AND SYSTEM FOR FAST TIMING RECOVERY FOR PREAMBLE BASED TRANSMISSION SYSTEMS

(75) Inventors: Kanu Chadha, Acton, MA (US);
Maneesh Soni, Richardson, TX (US);
Manish Bhardwaj, Acton, MA (US)

(73) Assignee: Edgewater Computer Systems, Inc.,
Ottawa, Ontario (CA)

( * ) Notice: Subject to any disclaimer, the term of this patent is extended or adjusted under 35 U.S.C. 154(b) by 744 days.

(21) Appl. No.: 10/712,800

(22) Filed: Nov. 13, 2003

(65) Prior Publication Data

US 2004/0170237 A1    Sep. 2, 2004

Related U.S. Application Data

(60) Provisional application No. 60/426,214, filed on Nov. 14, 2002.

(51) Int. Cl.
*H03D 1/00* (2006.01)
*H04L 27/06* (2006.01)

(52) U.S. Cl. .................. 375/43; 375/354; 375/355; 375/365; 375/368

(58) Field of Classification Search ........... 375/364, 375/360, 355, 343, 365, 368, 354, 346
See application file for complete search history.

(56) References Cited

U.S. PATENT DOCUMENTS

| 7,061,427 | B2 * | 6/2006 | Hoffmann et al. | 342/367 |
| 7,065,036 | B1 * | 6/2006 | Ryan | 370/208 |
| 2004/0052319 | A1 * | 3/2004 | Wakamatsu | 375/343 |

* cited by examiner

*Primary Examiner*—Ted Wang
(74) *Attorney, Agent, or Firm*—Hamilton, Brook, Smith & Reynolds, P.C.

(57) ABSTRACT

Using a combination of auto-correlation and cross-correlation techniques provides a symbol timing recovery in a Wireless Local Area Network (WLAN) environment that is extremely robust to wireless channel impairments such as noise, multi-path and carrier frequency offset. An auto-correlator provides an estimate for a symbol boundary, and a cross-correlator is subsequently used to more precisely identify the symbol boundary. Peak processing of the cross-correlation results provides further refinement in symbol boundary detection. In receiving a packet conforming to the IEEE 802.11a standard, the method requires a minimum of only three short symbols of the 802.11a short preamble to determine timing, and guarantees timing lock within the duration of the 802.11a short preamble. This method and system can be easily applied to any other preamble based system such as 802.11g and High Performance Radio LAN/2 (HIPERLAN/2).

26 Claims, 7 Drawing Sheets

METHOD AND SYSTEM FOR FAST TIMING RECOVERY FOR PREAMBLE BASED TRANSMISSION SYSTEMS

RELATED APPLICATION

This application claims the benefit of U.S. Provisional Application No. 60/426,214, filed Nov. 14, 2002. The entire teachings of the above application are incorporated herein by reference.

BACKGROUND OF THE INVENTION

The IEEE standard 802.11a pertains to wireless local area networks (WLAN), and adopts Orthogonal Frequency Division Multiplexing (OFDM). OFDM is a technology that transmits data as multiple signals simultaneously over a single transmission path. OFDM spreads the data over a large number of carriers that are spaced apart at precise frequencies. Typically, a transmitter transforms frequency based data into the time-domain using an Inverse Fast Fourier Transform (IFFT) algorithm prior to transmission. A receiver then transforms a received packet back to the frequency domain using a Fast Fourier Transform (FFT) algorithm. The total number of sub-carriers translates into the number of points of the IFFT/FFT. In a wireless networking environment, OFDM has inherent advantages over a signal carrier system in a frequency-selective fading channel, such as high spectral efficiency, resiliency to RF interference, and lower multi-path distortion.

The IEEE 802.11 standard defines both an ad-hoc wireless network configuration and an infrastructure wireless network configuration that comprise a Basic Service Set (BSS). The ad-hoc configuration operates in a peer-to-peer mode that enables mobile stations to connect to each other directly, without the use of an access point. The infrastructure network configuration uses access points that bridge individual mobile stations with a wired network. Thus, receivers can be located at either individual mobile stations, or at access points to the network.

Under 802.11a, packets are mapped into a framing format suitable for sending and receiving user data and management information between two or more stations. This format includes a preamble field that includes a short preamble and a long preamble. The short preamble consists of 10 repetitions of a 16 sample short training symbol. The short preamble is used for received signal strength intensity (RSSI), automatic gain control (AGC), and coarse frequency synchronization. Subsequent to the preambles are a signal field, followed by multiple data fields. It is of critical importance to determine field boundaries as soon as possible in order to avoid a mismatch when processing the packet, and consequently, to avoid loss of the packet.

Two alternate methods of correlation have been used in connection with the preambles to determine field boundaries. An auto-correlation of the received signal involves correlating the signal with a delayed version of itself with the length of the correlation window equal to the length of a short symbol. When using an auto-correlation, a correlation plateau occurs due to the periodic nature of the short preamble. One approach to timing recovery is to look for the end of the correlation plateau in order to determine the field boundary.

A second approach uses a cross-correlation (or matched filter) between the received signal and the known values of the short symbol. Because the short preamble consists of 10 repetitions of a 16 sample training symbol, when the incoming data stream is correlated with the preamble, ideally the cross-correlation generates a peak every 16 samples, for a total of 10 peaks. This second approach looks to the last peak to identify the field boundary.

SUMMARY OF THE INVENTION

In a packet oriented wireless network, fast timing acquisition at the receiver, robust to noise and multi-path effects, is highly desired. Each of the approaches of auto-correlation and cross-correlation for determining the field boundary has its own limitations. In the case of auto-correlation, in the presence of noise, the end of the correlation plateau varies more than the duration of the cyclic prefix. Therefore, simply using the end of the auto-correlation plateau alone proves to be an unreliable timing metric. With regard to cross-correlation, the robustness of the peaks in the presence of noise ensures good performance of the timing algorithm at low signal-to-noise ratio (SNR) values. However, multi-path still poses a problem because signal copies cause multiple peaks near the desired peak locations. In the presence of multi-path, not only will there be a peak every 16 samples, but also spurious peaks that may effect the detection of the field boundary.

A new method for timing recovery for fast synchronization has been proposed and implemented. It utilizes the approaches of both auto-correlation and cross-correlation and performs intelligent post processing of their outputs. The method employs auto-correlation on an incoming signal to provide an initial estimate of the field boundary, and subsequently uses cross-correlation to refine that estimate. The proposed method maintains performance, measured by packet loss due to timing lock failure, as multi-path worsens in a typical wireless channel. It is imperative that timing lock be achieved within the short preamble in order to prevent packet loss.

Thus, in accordance with the present invention, an auto-correlation is performed on samples of an incoming packet to identify a symbol and a first approximation of a trailing boundary of the symbol. Subsequently, a cross-correlation between samples of the incoming packet and standard symbol values is used to more precisely identify the trailing symbol boundary near the first approximation.

One embodiment of the present invention includes identifying the start of a signal by identifying an increase in power, and then monitoring an auto-correlation of the incoming signal for a correlation plateau. Once a drop in the plateau is identified as an estimated field boundary, a cross-correlation is performed on a small window of the samples near the identified estimate. An algorithm is used to evaluate a set number of maximum peak values from the cross-correlation results. The indices of those peak values are needed to determine the peak that occurred last in time within the correlation plateau. By examining the indices of those peak values, the system is able to refine the estimated field boundary and identify the symbol timing boundary within the signal's short training preamble.

In different embodiments of the invention, because a certain number of cross-correlation peaks occurring most recently in the cross-correlation results are likely to be spurious peaks, the last few cross-correlation values are ignored prior to determining the peak that occurred last in time within the correlation plateau. Additionally, an algorithm can be applied to determine and select the most likely symbol timing boundary from the remaining maximum peak values.

Although this method has been applied particularly with respect to 802.11a packets in WLAN, it will be apparent to those skilled in the art that the method may be applied to other data transmission systems, particularly those that use preamble sequences. For example, the invention can also be applied to 802.11g and High Performance Radio LAN/2 (HIPERLAN/2).

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
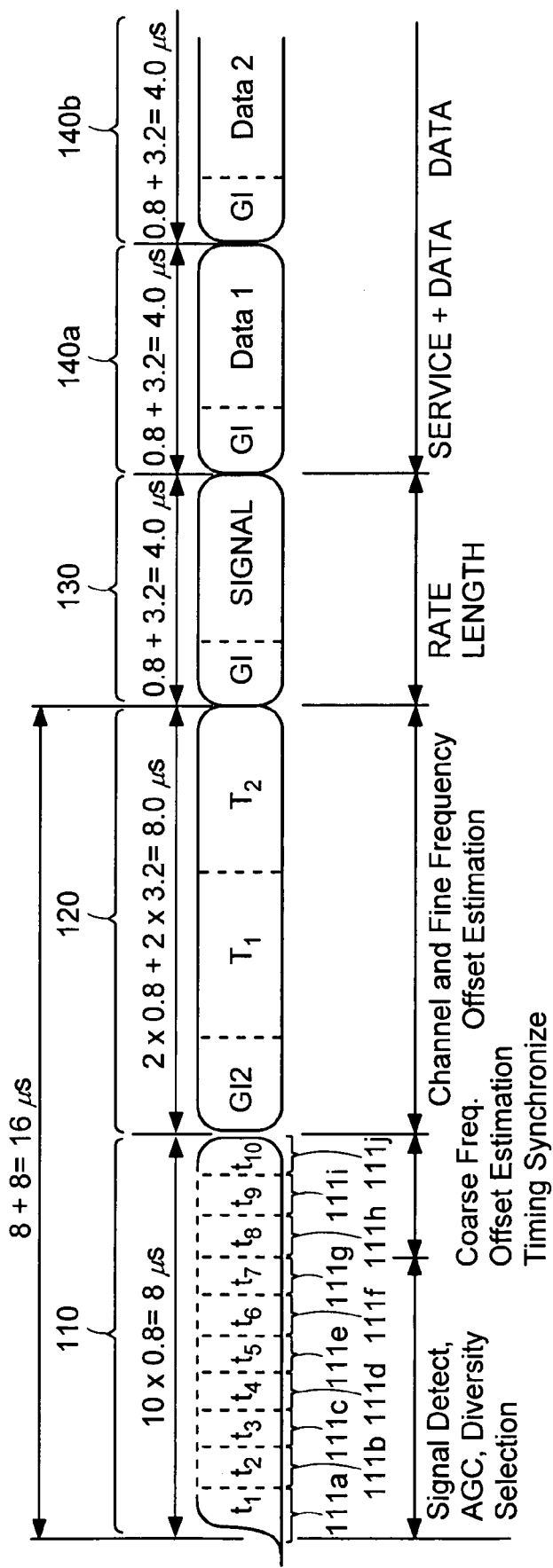
FIG. 1 is a schematic illustration of the 802.11a training structure.

The embodiments of the invention described herein, are particularly concerned with the IEEE 802.11a OFDM preamble structure, shown in FIG. 1, which includes both a short preamble (110) and a long preamble (120). The short preamble itself consists of 10 repetitions of 16 samples of a short symbol (111$a$-$j$). Since the short preamble is used for received signal strength intensity (RSSI), automatic gain control (AGC), and coarse frequency synchronization, there are only four to five short symbols left for the purpose of timing acquisition. Even though the addition of the cyclic prefix allows some tolerance in the estimate of the symbol timing, it is imperative that timing lock be achieved within the short preamble to avoid packet loss. Following the short preamble is the long preamble (120), a signal field (130), and a plurality of data fields (140$a$ et seq.). However, the primary concern is to achieve timing acquisition within the short preamble.

Figure 2:
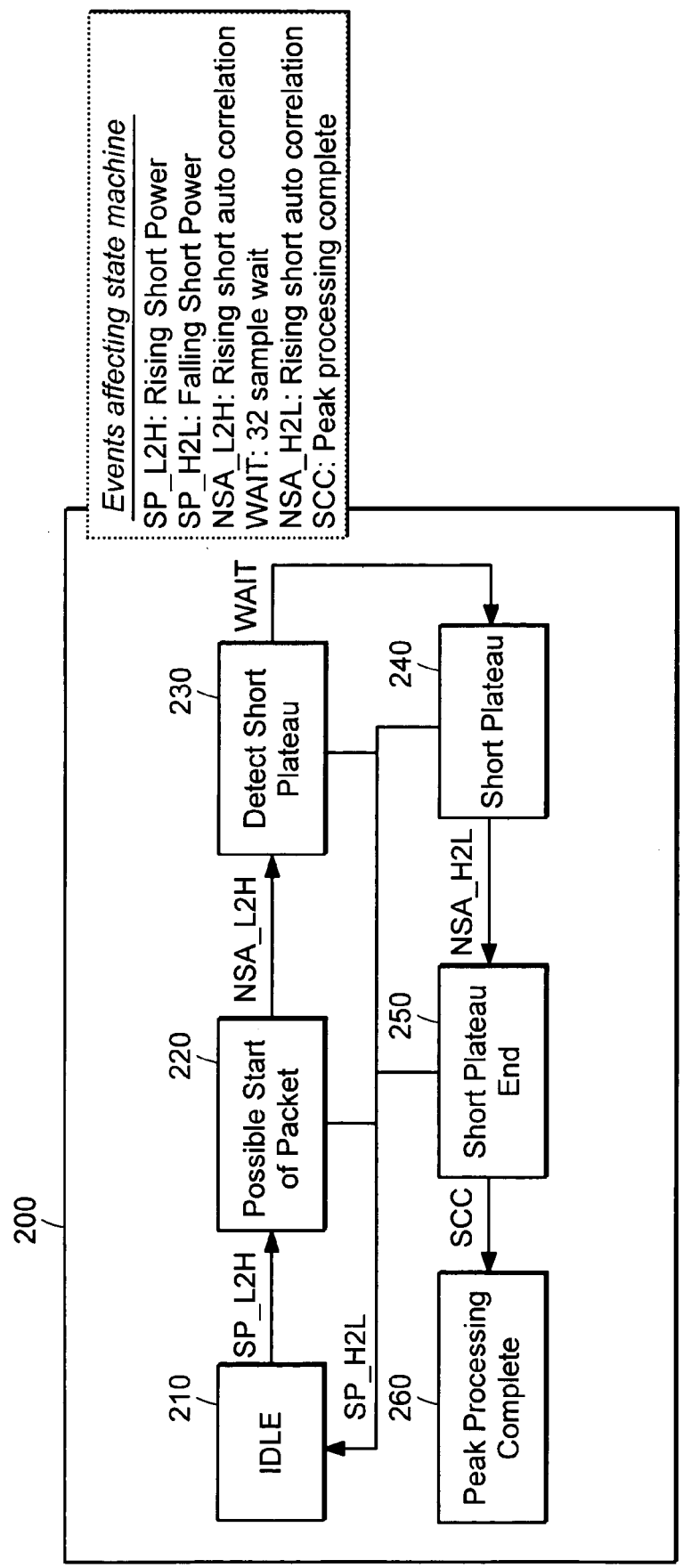
FIG. 2 is a block diagram illustrating the state machine for determining the timing boundary.

The state machine (200) of FIG. 2, demonstrates steps taken in identifying a field boundary. The state machine begins in an idle state (210). Power levels for incoming signal at the receiver are monitored. When an increase in power is detected, that increase indicates to the system (SP_L2H) the possible start of a packet (220). Different criteria can be employed for determining power detection. For example, a particular embodiment of the invention identifies a start of a packet if the power level is beyond a certain threshold amount for more than 4 consecutive clock cycles. By monitoring the changes in the power, rather than continually monitoring an auto-correlation of incoming packets, the system avoids unnecessary computational complexity. At any stage, a drop in the power (SP_H2L) will place the state machine (200) back into its initial idle state. (210)

Figure 3A:
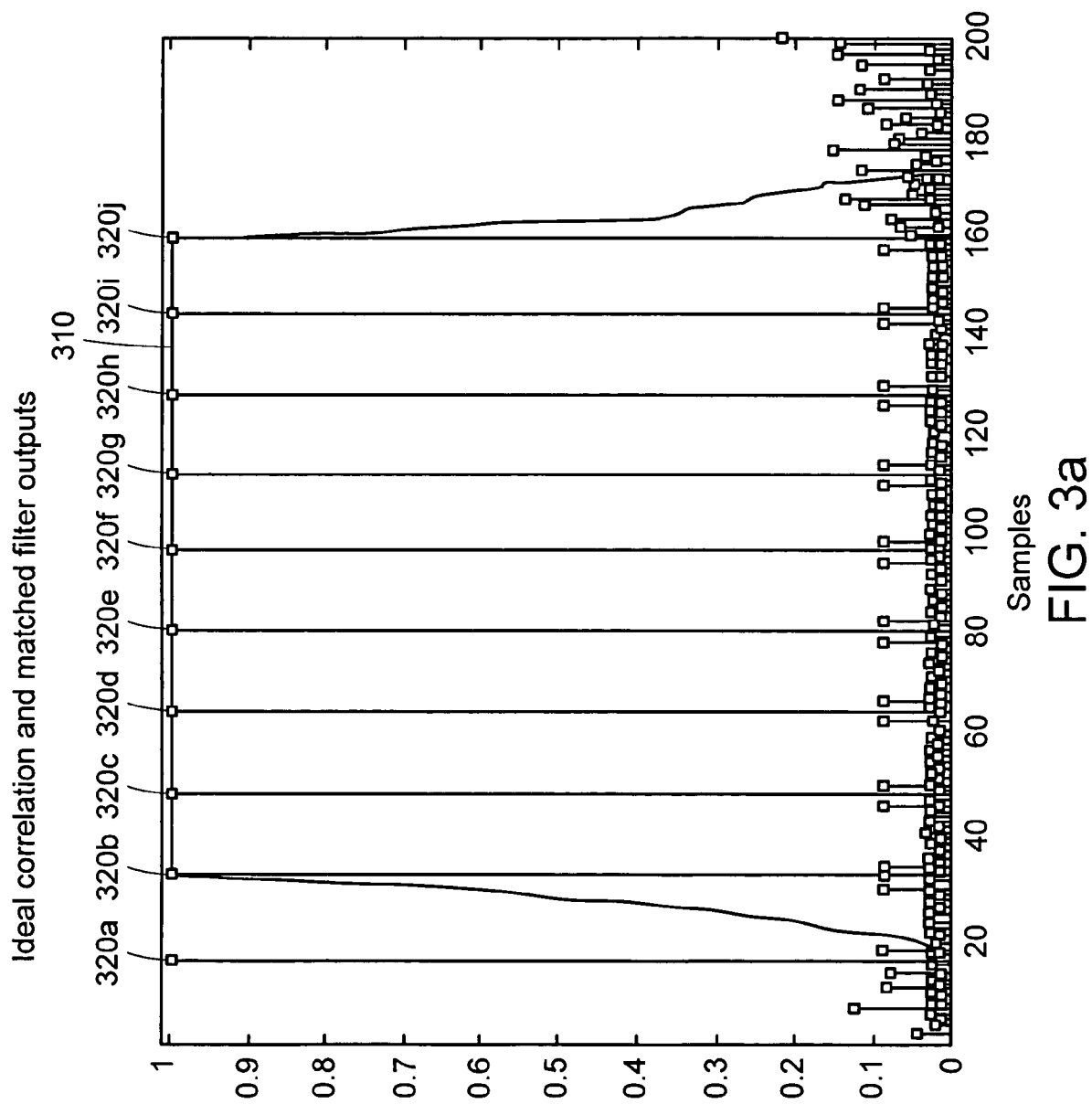
FIG. 3a is a graph showing the auto-correlation and cross-correlation results of an 802.11a signal in an ideal transmission environment.
Figure 3B:
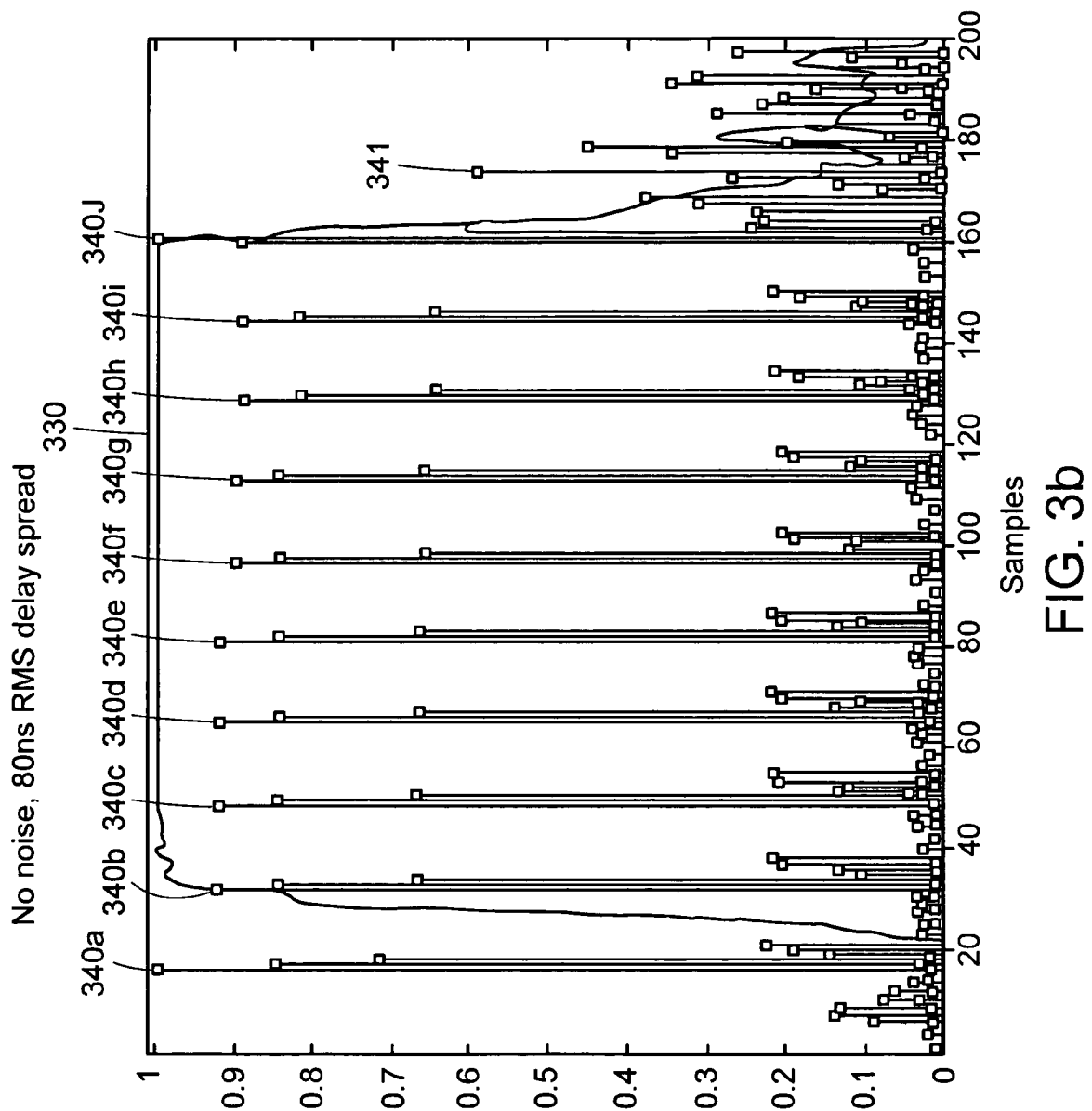
FIG. 3b is a graph showing the auto-correlation and cross-correlation results of an 802.11a signal in a noise free transmission environment with multi-path.
Figure 3C:
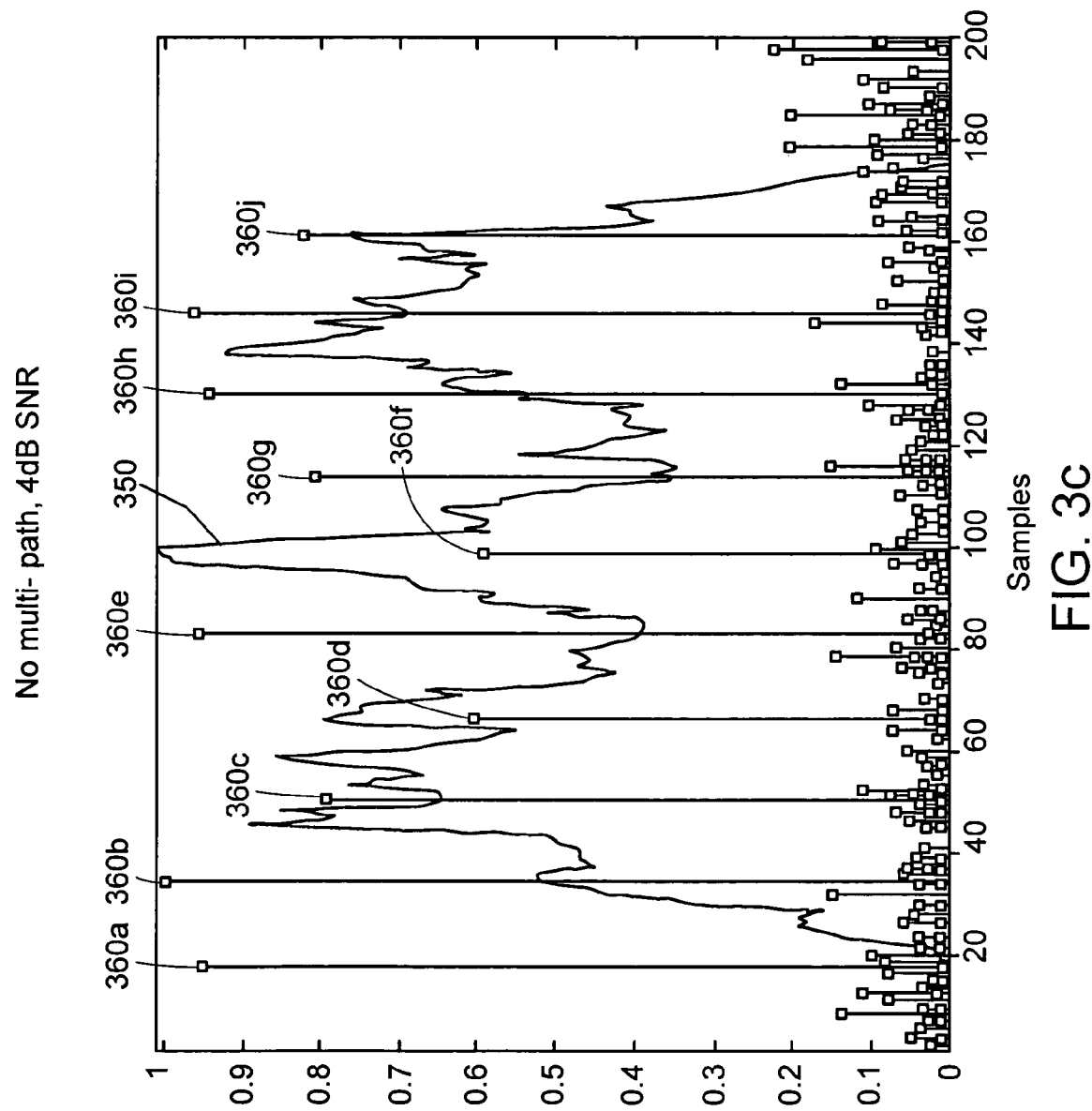
FIG. 3c is a graph showing auto-correlation and cross-correlation results of an 802.11a signal in noisy transmission environment in the absence of multi-path.

Once the system identifies a potential packet, it then begins performing an auto-correlation of the incoming signal for a correlation plateau. An auto-correlation plateau is detected (230) by a rising auto correlation (NSA_L2H). The auto-correlation plateau is first monitored to ensure against false alarms by waiting for a number of samples plateau samples (WAIT). Subsequently, the auto-correlation plateau is monitored (240) for an eventual drop (NSA_H2L), which serves as an estimated field boundary. As shown in FIG. 3a, in an ideal transmission environment with no noise and no multi-path, the auto-correlation will provide an even plateau (310) with a sharp drop at the short (320$j$) preamble boundary. In the case of FIG. 3a, where the packet is an 802.11a packet, that boundary occurs near the 160$^{th}$ sample (10 repetitions of the 16 sample short training symbol). Similarly, the auto-correlation plateau (330) has a clearly delineated drop (340$j$) in an environment with no noise, but with multi-path as shown in FIG. 3b. In a noisy environment as in FIG. 3c, the precise packet boundary is difficult to determine because the auto-correlation does not provide a clearly defined plateau (350) with a clearly defined ending.

Subsequently, the end of the plateau is more precisely calculated by performing a cross-correlation on a small window of the samples near the identified estimate, and then processing the resulting peaks (250). The coefficients of the matched filter are the complex conjugated values of a short symbol. In accordance with the short preamble structure of 802.11a, the cross correlation of incoming stream with the matched filter should generate a peak every 16 samples. In the ideal transmission environment shown in FIG. 3a, the cross-correlation will provide clear peaks (320$a$-$j$), for every one of the 10 repetitions of the short symbols, with the last peak (320$j$) providing the short preamble boundary. Even in the presence of noise, but the absence of multi-path as in FIG. 3c, the cross-correlation still creates clear peaks (360$a$-$j$). However as shown in FIG. 3b, in the presence of multi-path, a spurious peak (341) outside the preamble boundary can interfere with the boundary detection using simply the cross-correlation.

Figure 4:
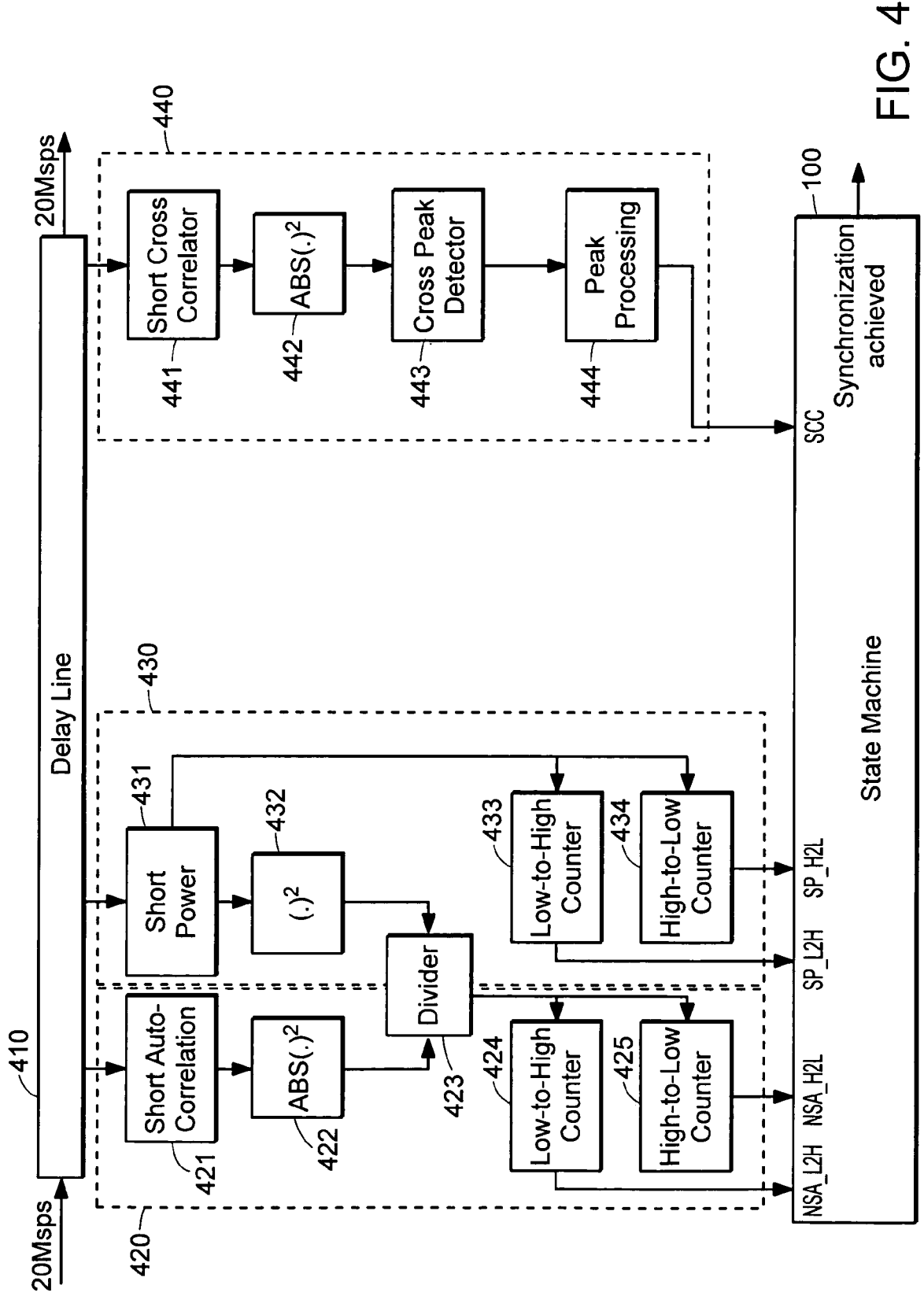
FIG. 4 is a block diagram illustrating an Application-Specific Integrated Circuit (ASIC) implementation of the invention.

At the peak processing stage (444) of an embodiment of the invention illustrated in FIG. 4, a set number of maximum peak values from the cross-correlation results are evaluated, and those values are used to refine the estimated field boundary. The indices of the peak values are needed to determine the peak that occurred last in time within the correlation plateau. This peak provides the symbol timing boundary within the short training preamble.

Once the peak is identified (SCC), the system sets a countdown timer to synchronize the receiver with the field boundary and allow processing of the data within the remainder of the packet (260).

A detailed illustration of an ASIC implementation of the process discussed above is presented in FIG. 4. In a preferred embodiment of the present invention, the incoming packet is sampled at the base OFDM sampling rate of 20 Msps and the samples are fed into a delay line (410). The delay line consists of pipelined registers that hold incoming packet sample values. The hardware blocks tap the delay line registers to perform various operations including:

Square Power (Short Power) of incoming samples, calculated over 16 samples (430);

Magnitude square of auto-correlation normalized with the square of power, calculated over 16 samples (420); and Cross-correlation of incoming samples with a short symbol of the preamble, calculated over 32 samples (440).

All computations are highly quantized to 6 bit fixed point operations. Apart from the arithmetic computation blocks, there are a number of counters that monitor the results of the computations. These counters determine the transitions of the state machine (200), as illustrated in FIG. 2. The thresholds for detecting the start and end of the correlation plateau, and the number of times the correlation metric must exceed the threshold to qualify as a valid transition are kept programmable. Another useful programmable parameter governs the exact starting point of the long symbol once the last peak within the correlation plateau has been found. These programmable parameters permit performance tweaking in various multi-path scenarios. For robustness, the auto-correlation plateau is programmed with a minimum length of 32; if a measured plateau does not meet the minimum length, the packet is discarded to guard against false timing locks.

As a packet is received at the receiver and enters the delay line (410), a rise in the power will be detected by hardware (430) monitoring power levels for incoming packets. In the embodiment of FIG. 4, the power detector (431) taps the delay line at registers R[0] and R[16]. In this implementation, each register of the delay line holds two values: one value for the real part of a complex number and another value for the imaginary part. The complex conjugate of a register value will be referred herein as R*[0]. The short symbol power is calculated by the formula:

$$P = \sum_{i=0}^{15} (x[i])^2$$

Thus, the power is the summation of the running buffer of 16 samples, and at a given time the power can be represented by the equation:

$$P[n]=P[n-1]+(|R[0]|)^2-(|R[16]|)^2$$

where samples enter the delay line at R[0], and R[16] contained the last sample in the 16 sample buffer of P[n−1], and $(|R[N]|)^2$ represents the squared absolute value of the complex number located in R[N].

The power values are fed into a low-to-high counter (433) and a high-to-low counter (434). In an embodiment of the present invention, each of those counters keeps track of an increase or decrease in the magnitudes of the power values. For example, the low-to-high counter (433) alerts the state machine (200) to a possible start of a packet if the power level is beyond a certain threshold amount for more than 4 consecutive clock cycles. If the threshold amount is not met for four consecutive clock cycle, the counter automatically resets. Both the threshold and the number of consecutive sample power values required can be programmed to account for particular transmission environments. Similarly, the high-to low counter (434) identifies a drop in the power to the state machine (200) to reset the state machine in the presence of false alarms.

Once the system becomes aware of a possible start of a packet, a short auto-correlation of the received packet is performed by correlating the packet with a delayed version of itself, with the length of the correlation window equal to the length of a short symbol. In an embodiment of the invention, the auto-correlation is computed according the following formula:

$$A = \sum_{i=0}^{15} (x[i]x*[i-16])$$

which represents the auto-correlation of 32 samples, delayed by 32 samples.

In this embodiment, as shown in FIG. 4, the short auto-correlator (420) can be implemented using 3 taps in the delay line at three registers R[0], R[16], and R[32], where samples enter the delay line at R[0]. Those three registers can be used to generate the auto-correlation results of the incoming packet. Because the complex conjugate represents a change in the sign of the imaginary part of the complex number, a single register tap provides both the complex number and its conjugate. The short auto-correlator uses the register values and their complex conjugates to perform the auto-correlation. (421) The auto-correlation value can be calculated by the following example:

$$A[0]=R[0]*R*[16]+R[1]*R*[17]+R[2]*R*[18]\ldots R[14]*R*[30]+R[15]*R*[31]$$

where R[N] is the value in register N, and R*[N+16] was the complex conjugate value of register N of the packet delayed by 16 samples.

As a new sample comes into the delay line, the values in each register shift along the register pipeline, so that after the shift:

$$A[0]=R[1]*R*[17]+R[2]*R*[18]+R[3]*R*[19]\ldots R[15]*R*[31]+R[16]*R*[32]$$

while the current auto-correlation calculation with the new sample is:

$$A[1]=R[0]*R*[16]+R[1]*R*[17]+R[2]*R*[18]\ldots R[14]*R*[30]+R[15]*R*[31]$$

which can be simplified to:

$$A[1]=A[0]-R[16]*R*[32]+R[0]*R*[16]$$

and generalized as:

$$A[n]=A[n-1]-R[16]*R*[32]+R[0]*R*[16]$$

Thus, the auto-correlation of the packet with incoming signals can be computed with three taps in the delay line and a buffer that holds the previous auto-correlation value.

The auto-correlation output values are normalized with the energy of the signal from the short power detector (431) to produce a correlation plateau with an ideal (noise free) maximum value equal to 1. The normalization is performed by taking the absolute value squared of the short auto-correlation (422) and dividing it (423) with the short power squared (432). The correlation plateau is detected in a low-to-high counter (424) when the correlation metric crosses a predefined threshold a certain number of times.

The duration of the auto correlation plateau is an important indicator of the extent of the short preamble. For a received packet, which allows 5 short symbols for timing estimation, the length of the correlation plateau would be 16×5−32=48. In the proposed algorithm, we require a minimum plateau length of 32 to guard against false alarms. However, other required plateau lengths could be programmed as well. A high-to-low counter (425) is provided to count the number of samples to detect the short plateau (230). Once the plateau us detected, the state machine looks for a plateau drop (240), to estimate the symbol timing boundary, otherwise it resets the state machine.

As discussed above, a conventional approach to timing recovery would be to look for the end of the correlation plateau. However, in the presence of noise, the end of the plateau varies more than the duration of the cyclic prefix and proves to be an unreliable timing metric. In accordance with the present invention, a cross-correlator (440) is used to qualify the end of the plateau. Because the cross-correlator taps the first 32 registers in the delay line, i.e. R[0]-R[31], and involves the summation of the product of the packet samples and the matched filter values, it is computationally prohibitive. Thus, by calculating it only at the approximation determined by the auto-correlation, the symbol boundary is detected efficiently.

In the embodiment of the invention shown in FIG. 4, a cross correlation is performed (441) and the absolute value squared of those values are calculated (442). A cross peak detector (443) detects the peak values from those results. Subsequently, a peak processor (444) uses an algorithm to provide the state machine with the symbol boundary. The proposed algorithm intends to find the last matched filter peak within the correlation plateau to declare the beginning of the long preamble. The robustness of the peaks in the presence of noise ensures good performance of the timing algorithm at low SNR values. However, multi-path still poses a problem because signal copies cause multiple peaks near the desired peak locations. In the presence of multi-path, there are not only multiple peaks every 16 samples, but potentially a spurious peak at the end which is outside the plateau. Therefore, the peaks produced by the matched filter are intelligently processed to determine cheaply and efficiently the last peak in the correlation plateau.

Figure 5:
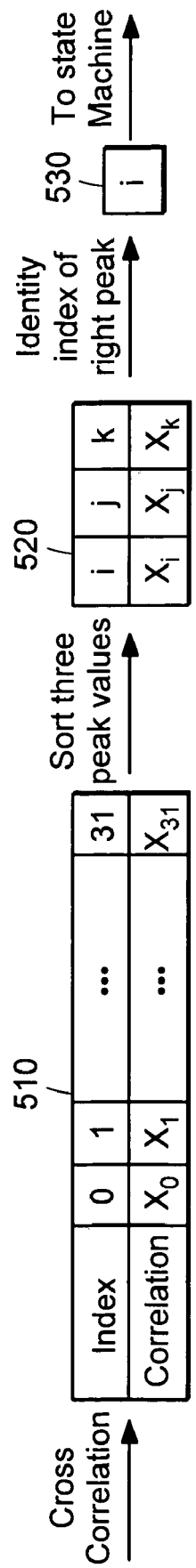
FIG. 5 is a block diagram illustrating the identification of a peak value for determining the timing boundary.

To actually process the cross-correlation peaks as performed in the cross peak detector and peak processor, a running buffer (510) of 32 values of the matched filter outputs is maintained as illustrated in FIG. 5. After the correlation metric drops below a certain threshold, the current buffer is first sorted to determine the three maximum values in the buffer (520). The indices of the three peak values are needed to determine the peak that occurred last in time, but inside the correlation plateau. It will be apparent to those skilled in the art that the number of peak values selected for processing can be adjusted to suit particular demands of the system.

In one embodiment of the invention, the next step to peak processing ignores any peaks whose indices lie in the last six positions of the buffer. These last positions in the buffer correspond to the correlation of last few values of the incoming signal to the matched filter. This takes care of the extra spurious peak that may occur due to multi-path. The number of indexed positions in which peak values will be ignored can be adjusted, or this step can be omitted altogether.

The peaks are evaluated in the order that they arrived in the cross-correlation buffer. Thus, the peak corresponding closest in time to the end of the auto-correlation plateau is the first peak. The index of first peak is selected as the initial value of symbol timing. If the index of the second peak is found to be 10 greater than the index of the current initial value of symbol timing, the symbol timing estimate is updated to the index of the second peak. This distance has been found effective under certain conditions, but can be adapted to suit particular needs.

If there is a third peak remaining, the index of that third peak is compared with the current value of the symbol timing, and if found greater than 10 values away, the symbol timing estimate is updated to the index of the third peak. Thus, after a three peak search and a maximum of three index comparisons, we have an estimate of the symbol timing (530). These operations are simple to do in hardware and thus, symbol timing is easily available by the end of the short preamble.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of timing synchronization to a symbol boundary of a packet comprising:
    performing an auto-correlation on samples of an incoming packet to identify the symbol and a first approximation of a trailing boundary of the symbol; and
    performing a cross-correlation between samples of the incoming packet and standard symbol values to more precisely identify the symbol trailing boundary near the first approximation, wherein performing a cross-correlation further includes processing the result of the cross-correlation to discard a number of the most recent cross-correlation values and identify the symbol trailing boundary from the remaining cross-correlation values.

2. A method of claim 1, wherein the symbol is the last symbol in a preamble.

3. A method of claim 1, wherein identifying the symbol timing boundary includes locating a number of maximum peaks in the remaining cross-correlation values and determining the symbol trailing boundary depending on the distance between the maximum peaks.

4. A method of claim 3, wherein identifying the symbol timing boundary further includes repeatedly selecting a maximum peak occurring earliest in time as the symbol timing boundary unless any of the remaining maximum peaks occurs a certain distance of cross-correlation values or more away, until a maximum peak has been identified as a symbol timing boundary.

5. A method of claim 4 wherein the number of maximum peaks is 3.

6. A method of claim 4 wherein the certain distance of cross-correlation values is 10.

7. A method of claim 1 wherein the packet and standard symbol values conform to the IEEE 802.11a standard.

8. A method of claim 1 wherein the packet and standard symbol values conform to the IEEE 802.11a standard.

9. A method of claim 1 wherein the timing synchronization occurs at a network access point.

10. A method of claim 1 where in the timing synchronization occurs at a individual mobile stations.

11. A method of claim 1 further comprising:
    detecting a rise in short power, where a rise is determined when the incoming power of a packet is above a set threshold for a set number of consecutive clock cycles; and
    in response to a detection of a rise in short power performing the auto-correlation.

12. A method of claim 11 wherein the set threshold is four consecutive clock cycles.

13. A method of timing synchronization to a symbol boundary of a packet conforming to an IEEE 802.11 standard occurring at a network access point comprising:
    detecting a rise in short power, wherein the incoming power of a signal is above a set threshold for a set number of consecutive clock cycles;
    in response to detection of rise in short power, performing an auto-correlation on samples of an incoming packet to identify the preamble and a first approximation of a trailing boundary of the preamble; and
    performing a cross-correlation between samples of an incoming packet and a standard preamble and processing the results by discarding a number of the most recent cross-correlation values, locating a number of maximum peaks in the remaining cross-correlation values, then repeatedly selecting a maximum peak occurring earliest in time as the symbol timing boundary unless any of the remaining maximum peaks occurs a certain distance of cross-correlation values or more away, until a maximum peak has been identified as a symbol timing boundary near the first approximation.

14. An apparatus for timing synchronization to a symbol boundary of a packet comprising:
an auto-correlator that performs an auto-correlation on samples of an incoming packet;
a cross-correlator that performs a cross-correlation between samples of the incoming packet and standard symbol value wherein the cross-correlator includes a peak processing module for discarding a number of the most recent cross-correlation values and identifying the symbol timing boundary from the remaining cross-correlation values; and
a processor with inputs from both the auto-correlator and the cross-correlator, wherein the processor first identifies a first approximation of a trailing boundary of the symbol using the input from the auto-correlator, and subsequently more precisely identifies the symbol timing boundary new the first approximation using the input from the cross-correlator.

15. An apparatus of claim 14 further comprising:
a delay line, the delay line having plurality of pipelined registers for receiving samples of an incoming packet, and having outputs to provide sample values to the auto-correlator and cross-correlator.

16. An apparatus of claim 14 wherein the peak processing module identifies the symbol timing boundary by locating a number of maximum peaks in the remaining cross-correlation values and determining the symbol trailing boundary depending on the distance between the maximum peaks.

17. An apparatus of claim 16 wherein the peak processing module further identifies the symbol timing boundary by repeatedly selecting a maximum peak occurring earliest in time as the symbol timing boundary unless any of the remaining maximum peaks occurs a certain distance of cross-correlation values or more away, until a maximum peak has been identified as a symbol timing boundary.

18. An apparatus of claim 17 wherein the number of maximum peaks is 3.

19. An apparatus of claim 17 wherein the distance of cross-correlation values is 10.

20. An apparatus of claim 14 wherein the packet and standard preamble conform to the IEEE 802.11a standard.

21. An apparatus of claim 14 wherein the packet and standard preamble conform to the IEEE 802.11g standard.

22. An apparatus of claim 14 further comprising:
a short power circuit connected to be registers of the delay line that detects a rise in short power, where a rise is determined when the incoming power of a packet is above a set threshold for a set number of consecutive data samples; and
wherein the processor further comprises an input from the short power circuit, and initiates the performance of the auto-correlation circuit when prompted by the short power circuit.

23. An apparatus of claim 22 wherein the set threshold is four consecutive data samples.

24. An apparatus of claim 14 wherein the apparatus is located in a network access point.

25. An apparatus located in network access point for timing synchronization to a symbol boundary of a packet conforming to an IEEE 802.11 standard comprising:
a delay line, the delay line having a plurality of pipelined registers for receiving samples of an incoming packet;
an auto-correlator connected to registers of the delay line that performs an auto-correlation on samples of an incoming packet;
a cross-correlator connected to registers of the delay line that performs a cross-correlation between samples of the incoming packet and standard preamble values, and includes a peak processing module for discarding a number of the most recent cross-correlation values, locating a number of in maximum peaks in the remaining cross-correlation values and determining the symbol trailing boundary depending on the distance between the maximum peaks, and then repeatedly selecting a maximum peak occurring earliest in time as the symbol timing boundary unless any of the remaining maximum peaks occurs a certain distance of cross-correlation values or more away, until a maximum peak has been identified as a symbol timing boundary;
a short power circuit connected to be registers of the delay line that detects a rise in short power, where a rise is determined when the incoming power of a packet is above a set threshold for a set number of consecutive data samples; and
a processor with inputs from the auto-correlation circuit, the cross-correlation circuit, and the short power circuit, wherein the processor initiates the performance of the auto-correlation circuit when prompted by the short power circuit, then identifies a first approximation of a trailing boundary of the preamble using the input from the auto-correlation circuit, and subsequently more precisely identifies the symbol timing boundary near the first approximation using the input from the cross-correlation circuit.

26. An apparatus for timing synchronization to a symbol boundary of a packet comprising:
means for performing an auto-correlation on samples of an incoming packet to identify the preamble and a first approximation of a trailing boundary of the preamble; and
means for performing a cross-correlation between samples of the incoming packet and standard preamble values to more precisely identify the symbol timing boundary near the first approximation; wherein performing a cross-correlation further includes processing the result of the cross-correlation to discard a number of the most recent cross-correlation values and identify the symbol trailing boundary from the remaining cross-correlation values.

* * * * *

UNITED STATES PATENT AND TRADEMARK OFFICE
CERTIFICATE OF CORRECTION

PATENT NO. : 7,415,059 B2  Page 1 of 1
APPLICATION NO. : 10/712800
DATED : August 19, 2008
INVENTOR(S) : Kanu Chadha, Maneesh Soni and Manish Bhardwaj It is certified that error appears in the above-identified patent and that said Letters Patent is hereby corrected as shown below:

Column 8

At Claim 8, line 36, please delete "11a" and insert --11g--; and

At Claim 13, line 56, please insert --a-- after "of".

Column 9

At Claim 14, line 10, please delete "value" and insert --values--;

At Claim 14, line 20, please delete "new" and insert --near--;

At Claim 15, line 23, please insert --a-- after "having"; and

At Claim 22, line 48, please delete "be" and insert --the--.

Column 10

At Claim 25, line 18, please delete "in"; and

At Claim 25, line 27, please delete "be" and insert --the--.

Signed and Sealed this

Eleventh Day of November, 2008

JON W. DUDAS
*Director of the United States Patent and Trademark Office*